United States Patent [19]

Di Piero

[11] 4,090,296
[45] May 23, 1978

[54] CABBAGE CORING TOOL

[76] Inventor: Philip Di Piero, 432 Elberen St., Youngstown, Ohio 44509

[21] Appl. No.: 799,449

[22] Filed: May 23, 1977

[51] Int. Cl.² .................................................. A47J 25/00
[52] U.S. Cl. ........................................ 30/113.1; 30/315; 30/352
[58] Field of Search ................. 30/278, 113.1, 113.3, 30/113.2, 315, 316, 352, 353

[56] References Cited

U.S. PATENT DOCUMENTS

| 198,954 | 1/1878 | Orendorff | 30/352 X |
|---|---|---|---|
| 275,253 | 4/1883 | Neblett | 30/352 X |
| 457,871 | 8/1891 | Silliman | 30/352 X |
| 759,005 | 5/1904 | McLeod | 30/352 X |
| 803,492 | 10/1905 | Landgraf | 30/352 X |
| 814,850 | 3/1906 | Kemmerer | 30/352 X |
| 959,189 | 5/1910 | Wyant | 30/352 X |
| 1,213,361 | 1/1917 | Hayward | 30/278 |
| 1,630,420 | 5/1927 | Garland | 30/352 X |
| 2,402,558 | 6/1946 | La Berge | 30/113.3 |
| 2,427,369 | 9/1947 | Ruple | 30/315 |

FOREIGN PATENT DOCUMENTS

| 419,482 | 3/1967 | Switzerland | 30/113.1 |
|---|---|---|---|
| 1,077,435 | 7/1967 | United Kingdom | 30/315 |

Primary Examiner—James L. Jones, Jr.
Assistant Examiner—J. T. Zatarga
Attorney, Agent, or Firm—Webster B. Harpman

[57] ABSTRACT

A cabbage coring tool has an elongated semi-triangular shaped blade which is cross sectionally arcuate with both of the longer edges being sharpened. An axially extending shank is joined to the blade midway of its widest section and a cross bar is affixed to the end of the shank to serve as a handle in rotating the tool and simultaneously moving it into a head of cabbage to remove the core therefrom.

2 Claims, 4 Drawing Figures

CABBAGE CORING TOOL

BACKGROUND OF THE INVENTION (1) Field of the Invention

This invention relates to tools useful in engaging materials, a portion of which is to be removed.

(2) Description of the Prior Art

Prior tools of a somewhat similar nature may be seen in U.S. Pat. No. 184,271; 849,988 and 2,021,982. The first of these patents discloses a knife for pitting fruit which is a conventional elongated knife blade with a handle and an arcuate band-like member defining substantially a half circle carried transversely at the outer end of the knife blade.

The second patent shows a pair of oppositely disposed arcuate blades extending axially of the handle, the ends of each of the blades having circumferentially extending sections together forming a major portion of a circle in the hand seeding implement of the second patent.

Neither of these disclosures suggests an elongated substantially triangular shaped cross sectionally arcuate blade with an axially extending shank and a cross bar for manually moving the same and neither of them discloses or suggests a device which could be easily inserted into a head of cabbage or the like by first presenting a pointed end as in the present invention.

U.S. Pat. No. 2,021,982 shows an earth auger with a transversely arcuate blade which defines substantially a half circle at its uppermost end and throughout its length. The blade gradually contracts or defines arcs formed about gradually lessening radii towards its lower end and the elongated edges of the blade curved towards one another and a substantially blunt point at the extreme lower edge of the blade.

The disclosure of U.S. Pat. No. 2,021,982 would neither suggest nor would make obvious to one skilled in the art the elongated semi-triangular shaped blade cross sectionally arcurate throughout its length and having its sharpened longer edges terminating in a sharpened point as in the present disclosure.

SUMMARY OF THE INVENTION

A cabbage coring tool or the like comprises an elongate substantially triangular shaped blade cross sectionally arcuate throughout its length with the exception of its lowermost pointed end. A shank extends axially of the semi-triangular shaped blade oppositely from its pointed end and a cross bar is affixed to the outer end of the shank to serve as a handle. The cross bar is preferably longer on one side of the shank than the other to provide extra leverage for the hand of the user holding the blade.

DESCRIPTION OF THE PREFERRED EMBODIMENT

Figure 1:
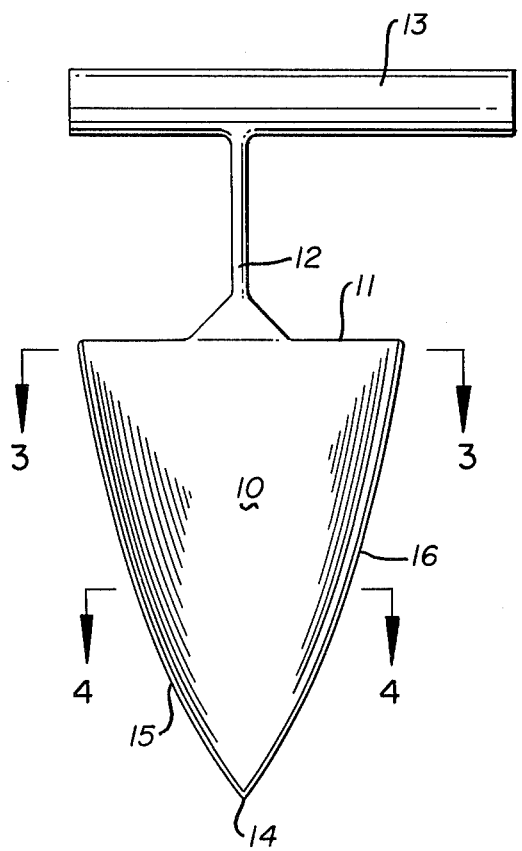
FIG. 1 is a front elevation view of a cabbage coring tool embodying the present invention.
Figure 2:
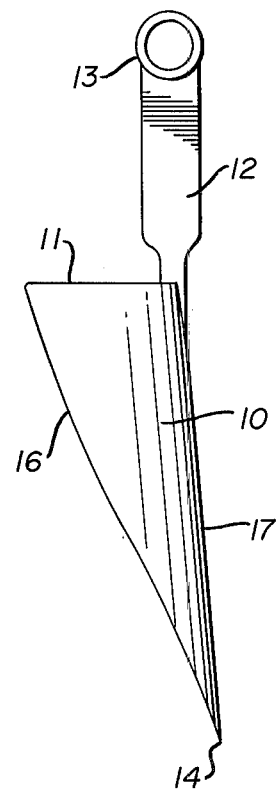
FIG. 2 is a side elevation view of the cabbage coring tool seen in FIG. 1.
Figure 3:
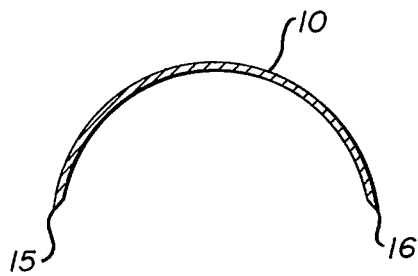
FIG. 3 is a horizontal section on line 3—3 of FIG. 1.
Figure 4:
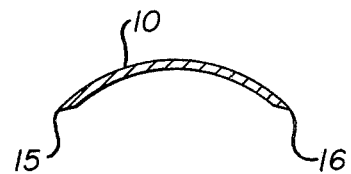
FIG. 4 is a horizontal section on line 4—4 of FIG. 1.

In the form of the invention chosen for illustration herein, a cabbage coring tool comprises, as may best be seen in FIGS. 1 and 2 of the drawings, an elongated semi-triangular shaped blade 10, which is arcuate in cross section as seen in the sections comprising FIGS. 3 and 4.

Still referring to FIGS. 1 and 2 it will be seen that the blade 10 has an upper planar end 11, the arcuate shape of which defines substantially half a circle as seen in FIG. 3 of the drawings and a shank 12 is affixed to the blade 10 at the uppermost end 11 and is either formed integrally with the blade 10 or affixed thereto and arranged to extend upwardly and outwardly of the blade. The shank 12 is cross sectionally rectangular and changes shape from its point of contact with the blade 10 as it extends outwardly therefrom and the uppermost or outermost end of the shank 12 is joined to a cross bar 13 which is preferably a tubular metal shape which serves as a handle by which a user grasps the tool and imparts a pushing twisting motion thereto so as to engage it in a cabbage, push it inwardly thereof and rotate it to remove the core therefrom.

By referring to FIG. 2 of the drawings, it will be seen that the elongated substantially triangular shaped blade is offset in one direction as seen in FIG. 2 with respect to the shank 12 with the upper end 11 of the blade defining the largest portion thereof and that the arcuate shape of the blade 10 is substantially half circular at this point and progressively tapers downwardly to a sharpened point 14.

In FIGS. 1 and 2 of the drawings, the elongated side edges of the blade 10 are sharpened to form knife edges 15 and 16, the sharpened edges extending from the top of the blade 11 to the point 14 thereof. The elongated semi-triangular shape of the blade 10 and its cross sectionally arcuate configuration causes the elongated sharpened edges 15 and 16 to appear as elongated curves in front elevation as in FIG. 1, and as oppositely disposed slightly curving convex and concave edges as seen in FIG. 2 of the drawings and the side elevation thereof.

By referring again to FIG. 2 of the drawings, it will be seen that the shank 12 while substantially axially arranged as it extends from the upper end 11 of the blade 10, is actually at a slight angle from the elongated center of the blade 10 and the plane thereof which is indicated in FIG. 2 of the drawings by the numeral 17. The arrangement of the shank 12 and the cross bar or handle 13 at a slight angle from the plane of the elongate middle section of the blade 10 enables the tool to be more easily rotated or partially rotated as it is being pushed into a head of cabbage at a point at one side of the core thereof so that as it is pushed into the vegetable and rotated, it will remove the core in its entirety.

It will occur to those skilled in the art that in removing the core from a head of cabbage the tool is positioned adjacent the widest portion of the core, the base of the head of cabbage, and that since the core as it extends into the cabbage tapers to a much smaller area, the configuration of the cabbage coring tool and the angular disposition of the handle and blade permit it to be more readily revolved in following the shape of the core so that when the same is removed it comprises a tapered portion.

Although but one embodiment of the present invention has been illustrated and described it will be apparent to those skilled in the art that various changes and modifications may be made without departing from the spirit of the invention and having thus described my invention what I claim is:

1. A cabbage coring tool comprising a triangular shaped blade of cross sectionally arcuate shape and defining a semi-circle at its upper end and having both side edges of the blade of uniform taper to a sharpened point at its lower end, said side edges being sharpened, a shank having a triangular lower end, said triangular lower end of said shank being cross sectionally arcuate and joined to said upper end of said triangular shaped blade midway thereof and on an arc matching the arc of said upper end of said blade and a cross bar on the opposite end of said shank, said shank extending upwardly from said upper end of said blade at a slight angle rearwardly from the axial center of said blade.

2. The cabbage coring tool of claim 1 and wherein the upper end of said triangular shaped blade is disposed on a common transverse plane and wherein said shank is rectangular in cross section outwardly of its triangular lower end and wherein the opposite end of said shank is turned a quarter turn so that the rectangular section thereof is crosswise with respect to the upper end of the blade and wherein the cross bar has a cross sectional width substantially the same as the widest portion of said shank joined thereto.

* * * * *